March 13, 1951     J. P. COWIE ET AL     2,544,749
AUTOMATIC PRESSURE WELDING APPARATUS
Filed Aug. 27, 1946     3 Sheets-Sheet 2
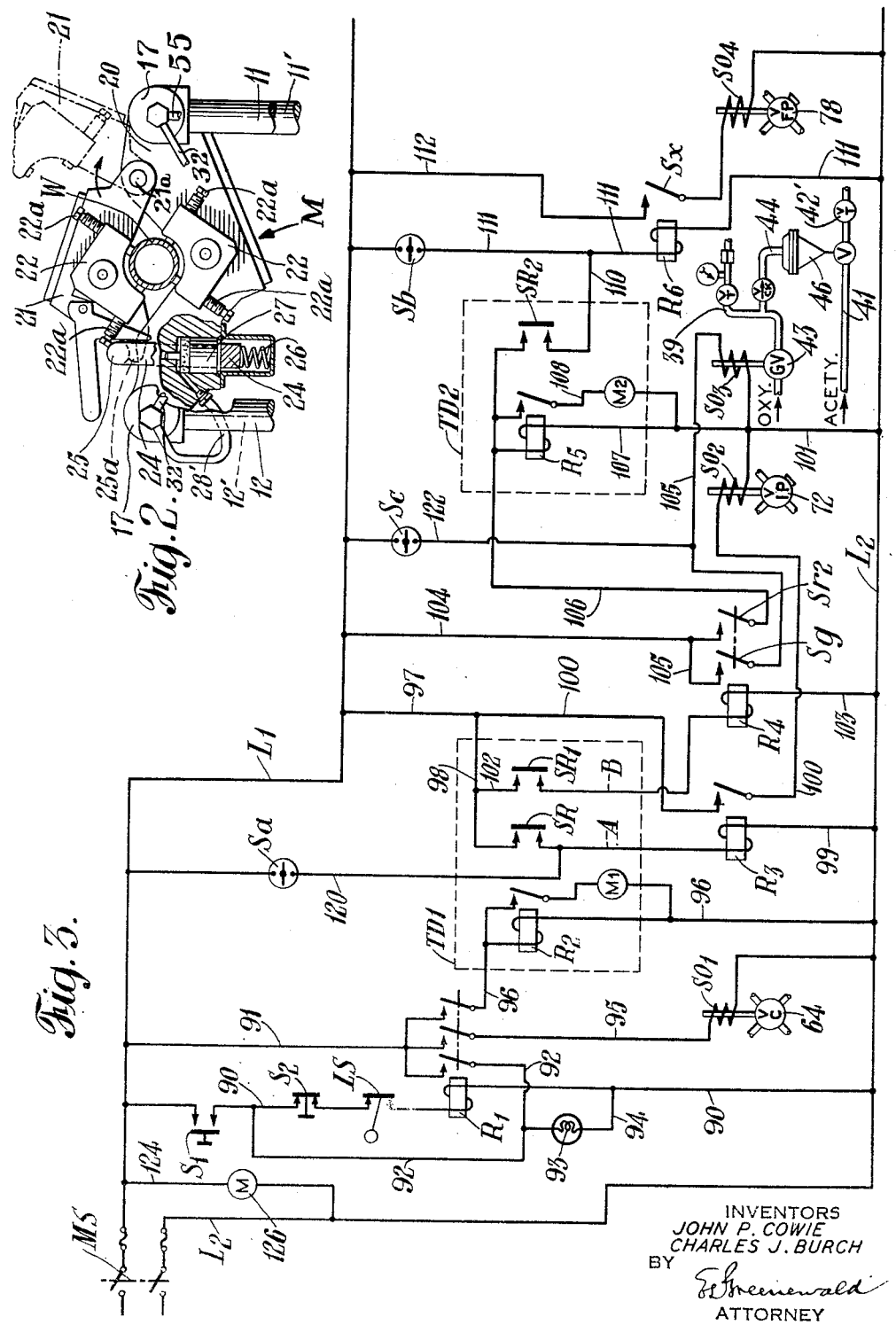
INVENTORS
JOHN P. COWIE
CHARLES J. BURCH
BY
ATTORNEY

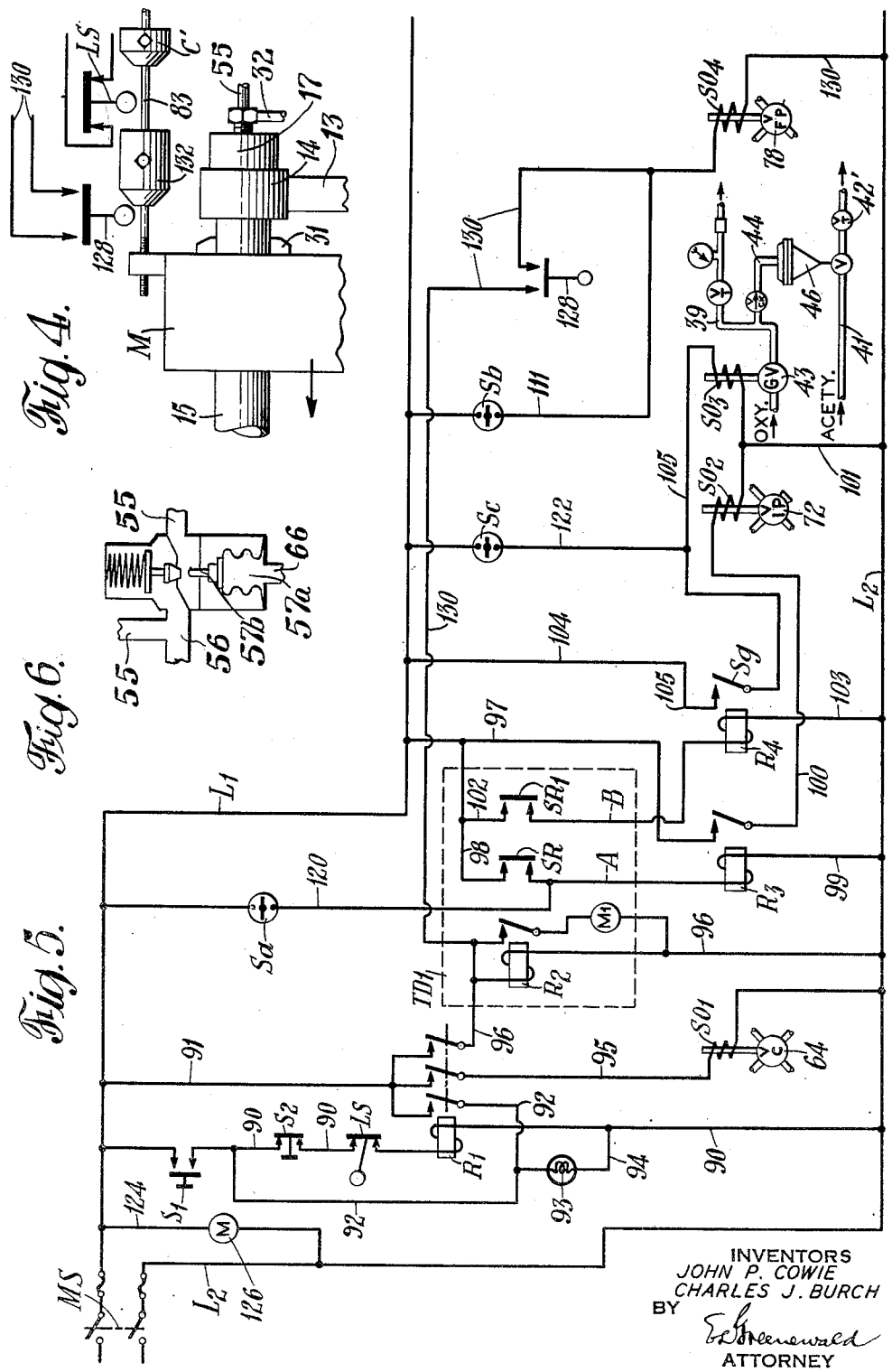

Patented Mar. 13, 1951

2,544,749

UNITED STATES PATENT OFFICE 2,544,749

AUTOMATIC PRESSURE WELDING APPARATUS

John P. Cowie, Youngstown, Ohio, and Charles J. Burch, Plainfield, N. J., assignors to The Linde Air Products Company, a corporation of Ohio Application August 27, 1946, Serial No. 693,340

10 Claims. (Cl. 78—84)

This invention relates to the art of butt-welding, and more especially it concerns a novel apparatus capable of producing a succession of identical welded joints of high quality from weldable metal members, preferably using the oxyacetylene or other gas welding process for supplying the welding heat. It has especial utility for the production of welded joints by pressing together under preselected pressures the abutting surfaces of the members to be joined while such surfaces are heated to a welding temeprature not substantially higher than the solidus temperature of the metal.

In the pressure welding of members and parts of ferrous and non-ferrous metals and alloys at temperatures around the solidus temperature thereof, slight variations in the welding conditions often materially affect the essential physical characteristics of the welded joint. Thus, the rate of heat input into the members at and adjacent the welding zone during the preheating period before the members reach the temperature at which the metal begins to soften and upset under the pressure employed, the maximum pressure employed during this preheating period and during the welding period, and even variations in the pressure forcing the members together during the actual welding and upsetting step, and the total amount of shortening of the members in the upsetting operation before completion of the weld, may and often do profoundly affect the physical characteristics of the welded joint.

Many attempts have been made to control accurately during welding operations conducted at temperatures around the solidus temperature of the metal, all welding conditions affecting the extent and character of the upset metal adjacent the joint being formed. Procedures aiming toward the control of certain critical welding conditions are described in United States Patent No. 2,231,014 of A. R. Lytle et al.

The present invention involves a novel apparatus for pressure welding metal members, subject to ready control by a single operator and yet capable of producing a continuous succession of similar welded joints under identical welding conditions. The invention includes automatic apparatus for conducting pressure welding operations at temperatures no higher than the solidus temperature of the metal members while the members being welded are forced together under high pressure; it provides for the use of preset hydraulic pressures both for clamping the members in abutting relation and for applying pressure forcing the abutting surfaces together, and for applying the clamping pressure to the members prior to the application of the welding pressure. Automatic means also are provided for preventing the application of welding heat to the members at and adjacent the abutted surfaces until after the members are securely clamped and are forced together under a preselected initial pressure. This insures that the surfaces to be united will be protected from attack by oxidizing influences while at elevated temperatures before being forced into intimate contact.

Other automatic means provide for selectively increasing or decreasing the welding pressure across the interface between abutting members after a preselected time interval following the initial application of the welding heat. This makes possible the use of high welding pressures providing the highest quality welded joints, while limiting the initial pressure employed during the preheating stage so as to minimize or prevent any premature upsetting of the metal at a time when the metal has not reached a welding temperature capable of yielding joints of suitable strength under the pressure applied. The use of unduly high pressures at the beginning of a welding operation may readily cause the metal at the interface to upset and weld superficially at a temperature below that required for the production of a strong welded joint. However, in certain welding operations, abutting pressures equal to or greater than that used during the metal-upsetting or shortening stage may be used during the initial heating stage to effect a prompt initiation of upsetting and welding of the metal.

The invention also provides automatic means for discontinuing the welding heat and for releasing the clamping pressure as well as the pressure forcing the members together after a preselected amount of upsetting or shortening of the members has occurred.

In the accompanying drawing, which illustrates the invention,

Fig. 2 is a fragmentary end view of a pressure welding apparatus of the type shown in Fig. 1, parts being broken away, and other parts being shown in section;

Fig. 3 is a schematic view of electrical control circuits and interassociated parts embodying the invention;

Fig. 4 is a fragmentary diagrammatic view of limit switches in another modification of the invention;

Fig. 5 is a schematic view of electrical control circuits and interassociated parts in the modification of Fig. 4; and Fig. 6 is a diagrammatic view in section of the pilot-controlled check valve.

Figure 1:
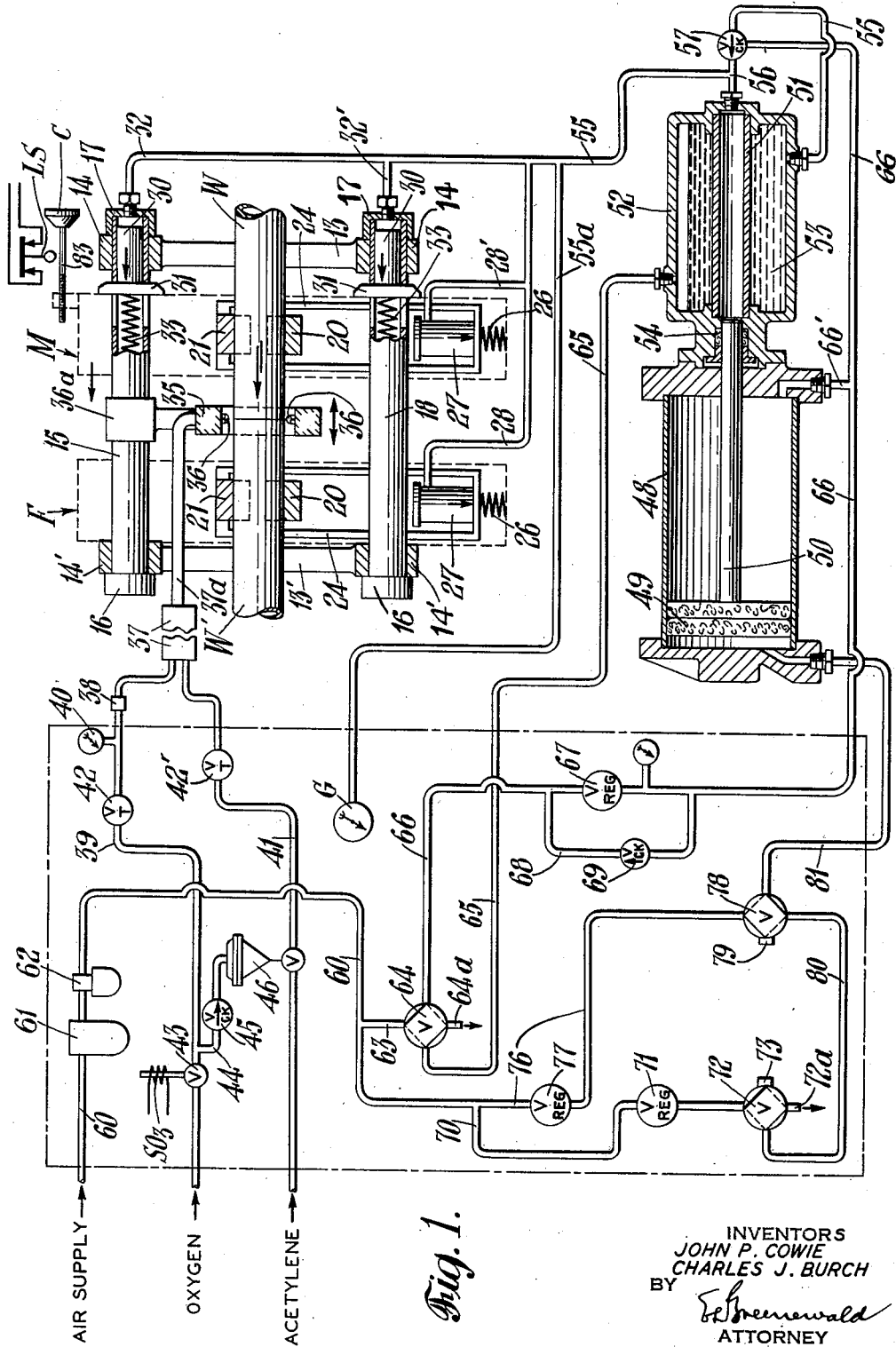
Fig. 1 is a somewhat diagrammatic view of a pressure welding apparatus and interassociated control mechanism, parts being broken away, and other parts being shown in section.

Referring to Figures 1 and 2 of the drawing, the pressure welding apparatus includes a supporting frame comprising four supporting standards 11, 11', 12, 12', the respective pairs thereof being connected by cross members 13, 13' (Fig. 1). Secured upon bushings 14, 14' at the upper end of standards 11, 11' is a tubular member 15 closed at one end by a cap 16 and at the other end by a cap 17 having an aperture for the introduction of a liquid under pressure through line 32. A tubular member 18 similar to member 15 is secured at the upper ends of standards 12, 12'.

A movable clamping unit M comprises a clamp member 20 mounted for sliding movement on the members 15, 18, and a clamp member 21 pivotally mounted at 21a on member 20. Mounted on each member 20, 21 is a corresponding adjustable member 22 having screw means 22a for centering and firmly securing the clamp members to the work W to be welded. For locking the members 20, 21 upon the work under pressure the member 20 carries a latch member 24 having a bar portion 25 adapted to engage the upper surface of a projection 25a on member 21. A spring 26 normally urges the latch member and bar 25 upwardly. The piston of a pressure cylinder 27 formed in member 20 moves downwardly when subjected to pressure from liquid flowing in line 28 and causes the bar 25 pressingly to engage the projection on member 21, thereby applying a clamping pressure upon the work W. Upon release of the pressure the spring 26 forces the bar 25 upwardly, releasing the clamping pressure on member 21 and on the work.

A fixed clamping unit F, similar to the clamping unit M, also is secured upon the members 15, 18. The clamping units differ in that the unit F is secured at all times in fixed position on members 15, 18, while the movable unit M is mounted for limited movement longitudinally of the members 15, 18.

For moving unit M toward and from the fixed unit F, each of the members 15, 18, has operatively associated therewith a piston 30 bearing against a pressure transmitting member 31 extending through aligned slots in the respective members 15, 18 and adapted to engage a lateral surface of the member 20 of the unit M. Oil or other liquid under pressure is supplied to the cylinders having the pistons 30 through lines 32, 32'. Compression springs 33, housed within members 15, 18, are operatively interposed between members 31 and the opposite ends of members 15, 18, and are sufficiently strong to neutralize the pressure of the pistons 30, 30 tending to move the unit M toward unit F when a low clamping pressure is applied thereto from reservoir 53, hereinafter described. The springs 33 yield under the high welding pressures applied during the pressure welding operation, allowing movement of unit M toward unit F. When the fluid pressure on lines 32, 32' is released, the springs move unit M to the right in Fig. 1.

For supplying welding heat to the work, in the form of apparatus shown, a sectional annular torch head 35, or other suitable welding head, having torch tips 36 or the equivalent, is carried on a suitable sleeve 36a slideably mounted on member 15 for limited movement back and forth across the interface formed by the abutting ends of members W, W'. The tips 36 direct a continuous sheet or stream of welding flames upon all parts of the work at and adjacent the outer margins of the abutting ends. The torch head is supplied through line 37a with a combustible gas mixture flowing from a mixing chamber 37 which is supplied with oxygen and with a combustible gas such as acetylene from suitable sources of supply through conduits 39, 41, controlled by needle valves 42, 42'. A metering spud 38 and pressure gauge 40 in line 39 after valve 42 facilitates close control of the flow of oxygen to the heating head 35. Gas flow to the welding torch is controlled by a solenoid-operated valve 43 disposed in the oxygen line 39. A pilot control line 44 having therein a check valve 45 with a small bleeder hole drilled in the seat thereof, leads from the downstream side of valve 43 to the diaphragm of a fluid-operated cut-off valve 46 which controls the flow of combustible gas through line 41 to the mixer 37. By this arrangement the initial flows of combustible gas and oxygen to the mixer are initiated practically simultaneously, but the oxygen flow is caused to cease a short period of time before the cessation of combustible gas flow at the end of the welding cycle, thereby causing the flame to extinguish smoothly and without popping.

For supplying at appropriate times the various stages of hydraulic pressure required for clamping the members to be united, and for pressing the members together at preset time intervals under a succession of preselected pressures, there is provided an air-hydraulic unit comprising a cylinder 48 having a piston 49 with leather rings, the rod 50 of which piston is adapted to move back and forth within a heavy-walled pressure tube 51. The ends of the latter are secured within the ends of a tubular shell 52 which surrounds the tube 51 and provides an annular oil reservoir 53. The shell 52 is secured to an end plate of the cylinder 48; and a packing gland 54 prevents escape of pressure fluid. The reservoir 53 is kept partially filled with oil or other pressure liquid. A liquid line 55 having therein a pilot controlled check valve 57 connects the lower part of reservoir 53 with lines 28, 28' leading to the clamping cylinders 27; and with lines 32, 32' leading to the cylinders housing the pistons 30, 30. The check valve 57, which is operative throughout the welding cycle, permits flow of oil from reservoir 53 to lines 32, 32' when the oil is under air pressure from line 65 and while operative prevents backflow of oil to the reservoir 53. Immediately after the welding cycle this valve is forced open by pressure in line 66 acting upon the pilot control bellows of valve 57, thereby allowing surplus oil to flow from the welding apparatus to the reservoir 53 and releasing the pressure at the welding apparatus.

As shown in Fig. 1, the air-hydraulic system for operating the clamping and pressure-applying mechanism includes an air conduit 60 leading from a source of air under suitable pressure. The air flows through a filter 61 and a lubricator 62 of well-known type, and thence is separated into three streams. One air stream flows through conduit 63 to a solenoid-operated four-way valve 64, the outlet from which selectively may be connected through line 65 with the air space in the upper part of oil reservoir 53 or, through lines 66, 66' with (1) the air space in cylinder 48 at the right of piston 49 and with (2) an extensible bellows 57a in check valve 57 having secured thereto a pin 57b adapted, when the bellows is expanded by air under pressure therein, to force the valve 57 from its seat and permit free liquid flow through line 55 in either direction. Line 66 has therein a pressure regulator 67, and a line 68 bypassing the regulator and having therein a check valve 69. Either of the lines 65, 66, when not under air line pressure, is exhausted to the atmosphere through outlet 64a of valve 64.

Another air stream flows through a line 70, having therein a pressure regulator 71, to a four-way, solenoid-operated valve 72 which, when not energized, is closed by the plug 73.

A third air stream flows through a line 76, having therein a pressure regulator 77, to a four-way, solenoid-operated valve 78 which, when not energized, is closed by the plug 79.

When valve 72 is energized, air flows from the valve through line 80 to valve 78. When the latter is not energized, this air then flows through valve 78 and line 81 to one end of cylinder 48 for operating piston 49. When valve 78 is energized, any air flow from line 80 is prevented by plug 79; and air at a pressure regulated by regulator 77 flows from line 76 to cylinder 48 through valve 78 and line 81.

The electrical circuits for controlling the automatic welding system are illustrated in Figure 3. These circuits comprise main feeder lines $L_1$, $L_2$ having therein a main switch MS. One circuit comprises a line 90 having therein a normally open starter switch or button $S_1$; a normally closed stop switch or button $S_2$; a normally closed limit switch LS having a lever arm secured in fixed relation to the clamping unit F and adapted to cooperate with a trip member C adjustably mounted upon a member 83 secured to movable clamping unit M of the welding apparatus to open the switch; and a relay $R_1$ (Fig. 3). The latter, when energized, acts in three ways: (1) it closes an electrical circuit through lines $L_1$, 91, 92, 90, switches $S_2$ and LS, and line $L_2$, and lights an operations light 93 in line 94; (2) it energizes the solenoid $SO_1$ of the clamping valve 64 by current flowing through lines 91 and 95, thereby causing hydraulic fluid to flow under pressure from reservoir 53 to the lines 28, 28', 32, 32'; and (3) it energizes the relay $R_2$ by current flowing through lines 91, 96, thereby actuating the motor $M_1$ of the timer TD1. The timer is so constructed and arranged that, when the relay $R_2$ energizes the timer motor, the latter functions after successive preselected intervals of time, depending upon the settings of the timer, to close each of two electrical circuits A and B. The timer is so regulated that, after a preselected time interval, the motor $M_1$ closes a switch SR which completes an electric circuit A through lines 97, 98 and 99, actuating the relay $R_3$. The latter then closes another circuit through lines 97, 100, 101, thereby energizing the solenoid $SO_2$ of the valve 72 and opening the latter. After an additional preselected period of time, the motor $M_1$ closes a switch $SR_1$ in a circuit B whereupon current flowing through lines 97, 98, 102 and 103 actuates relay $R_4$. The latter, in turn, closes switch Sg so that current flowing through lines 104, 105 and 101 energizes the solenoid $SO_3$ controlling the oxygen valve 43 and opens the latter. Simultaneously switch $Sr_2$ is closed, and current flowing through lines 104, 106, 107 and 101 energizes relay $R_5$. The latter, in turn, energizes the motor $M_2$ of a second timer TD2 through line 108. Timer TD2 is constructed somewhat similar to timer TD1 and is so regulated that, after a preselected time interval following its energization the motor $M_2$ closes a switch $SR_2$ which completes a circuit through lines 104, 106, 110 and 111 and actuates the relay $R_6$. The latter closes a switch Sx in line 112 and energizes the solenoid $SO_4$ operating the valve 78, thereby opening that valve.

Manually-operated normally open switches Sa and Sb, respectively disposed in lines 120 and 111, make possible the preadjustment of the initial and the final welding pressures to be employed prior to the time the welding heat is applied and the welding cycle begun. Likewise, the manually-controlled normally open valve Sc in line 122 permits the manual adjustment of the welding gases and of the flames before starting a pressure welding operation.

In practice the electric circuits and the air-hydraulic system of valves, air and liquid pressure lines and connections are housed for convenience and efficiency in an enclosed cabinet or table adapted to be positioned at or adjacent the welding machine. For insuring against any possible accumulation of combustible gases in the vicinity of these parts, an electric line 124 operates an electric blower 126 mounted within the cabinet when the line switch MS is closed.

A preferred method of practicing the invention, using apparatus of the type herein described, will now be given. Fig. 1 shows the initial setting of the solenoid-operated valves 64, 72 and 78. At the outset the welding flames first are correctly adjusted by temporarily closing switch Sc, and adjusting the acetylene and oxygen flow by means of valves 42, 42'. Switch Sc is then opened. The desired initial preheating pressure and the final welding pressure then are set, in turn, by manually closing the respective switches Sa and Sb temporarily, and adjusting the corresponding regulators 71 and 77 (see Fig. 1), in each case checking the pressure on gauge G. Preheating pressures of 300 or more pounds per square inch of cross-section of the abutting surfaces and welding pressures of 1,000 to 4,000 or more pounds per square inch of cross-section conveniently may be employed. Thereafter the limit switch LS is set so as to open after a selected shortening of the members to be welded has occurred.

The operator now places two members W, W' to be welded into the welding apparatus and closes the upper jaws 21, whereby the bars of the hold-down yokes 25 take a position over the projecting jaws 25a on members 21.

Upon depressing the starting button of switch $S_1$ (Fig. 3), relay $R_1$ is energized, and the signal lamp 93 is lighted and remains so throughout the welding operation. The relay energizes the timer TD1 and actuates the clamp valve 64. The latter then exhausts to the atmosphere through lines 66, 66' and 64a the air from the retraction end of the cylinder 48, and from the bellows of the pilot-operated check valve 57, permitting the valve again to function as a check valve. Concurrently air under pressure is imposed on oil reservoir 53, forcing oil at air-line pressure though check valve 57 to the cylinders 27, 27, where it forces the hold-down yokes upon the jaws 25a. This forces the jaw-set screw assemblies (Fig. 2) into contact with the workpieces W, W'.

When the first adjustable contact SR of the timer TDI is closed, e. g., in approximately three or four seconds after the clamping pressure is applied, the relay R3 is energized, reversing the valve 72 and admitting air, at a pressure controlled by the regulator 71, through the valve line 80, 78 and line 81 to the push-up port of the air cylinder 48. This forces piston 50 to the right (Fig. 1), develops hydraulic pressure in lines 55, 28, 28', 32 and 32', and forces the jaw-set screw clamps tighter against the workpieces and promptly forces the pieces together under the preset initial or preheating pressure. The second adjustable contact SR1 of the timer TDI commonly is adjusted to close about two seconds after contact SR. It actuates the relay R4 which then functions to actuate solenoid SO3 (Fig. 3) and open the valve 43 in the oxygen line. Oxygen then flows to the welding head past needle valve 42 and mixer 37. At the same time the oxygen pressure on the diaphragm of the acetylene valve 46, transmitted through line 44 past check valve 45, opens valve 46 and allows acetylene to flow to the welding head. A pilot light ignites the gases at the welding head.

The relay R4 also energizes a relay R5 of the second timer TD2. The motor M2 of the latter closes contact SR2 and actuates relay R6 upon the expiration of its present time cycle, which time varies with the cross-sectional thickness of workpieces W, W' being welded. This relay R6, in turn, closes contact Sx and actuates or reverses the valve 78, admitting air through lines 76, 81 to the push-up port of the cylinder 48 at a pressure regulated by regulator 77, and cutting off the air flow through valve 72 at the blank 79.

When the portions of the workpieces at and adjacent the abutting ends have reached a welding temperature not higher than the solidus temperature of the metal but sufficiently high to produce a selected amount of shortening of the workpieces due to metal upset under the preselected final welding pressure employed for which the limit switch LS has ben preset, this switch is forced open, thereby opening all electrical circuits, completing the welding cycle, deenergizing each of the relays R1 to R6, and resetting the timers TDI and TD2.

The opening of switch LS reverses clamp valve 64 and air under pressure in line 66 opens check valve 57 (Fig. 1), permitting quick reduction of pressure in lines 28, 28', 32, 32' by liquid flow to tube 51 and reservoir 53, thereby removing both welding pressure and clamping pressure from the workpieces. Concurrently air flowing through valve 64 and lines 66, 66' retracts piston rod 50 of cylinder 48 from the tube 51, while air pressure at the other side of the piston is released and flows through lines 81, valve 78, line 80 and valve 72 to the atmosphere through line 72a.

When the oxygen valve 43 is closed upon the opening of switch LS, oxygen on the downstream side of line 39 flows out through the welding head. The oxygen pressure on the diaphragm of valve 46 is released through a small hole in the seat of check valve 45. Thus the oxygen is cut off a brief time before the acetylene is cut off, thereby preventing popping of the gases at the welding head.

The pressure welding apparatus embodying the herein described automatic welding sequence control is capable of producing a succession of similar high quality welded joints in ferrous and non-ferrous metals and alloys, under any of a wide range of welding conditions, and using pressures ranging from less than 100 pounds per square inch of cross-section of abutting surfaces to 6,000 or more pounds per square inch. The invention provides the outstanding advantage that once the optimum welding conditions are determined for pressure welding workpieces of a particular shape, size, weight and composition, a succession of such joints can be made under substantially identical welding conditions. Such welded joints are relatively free from variations in quality commonly resulting from differences in the temperatures, pressures, times of heating, rate of heat input to the work, etc., employed in the usual manual operations, due to normal differences in the welding skills of different operators. Moreover, in welding operations involving careful reciprocation and/or oscillation of the welding head with respect to the interface between workpieces, the present invention eliminates the need for two or more operators, usually required where, in order to secure the highest quality joint, the pressure must be uniformly applied throughout the final welding and upsetting period, and where the pressure employed during the preheating stage of the operation must be relatively low in order to prevent incipient upsetting before a proper welding temperature is reached. By presetting the pressures to be used at the various stages of the process, and by insuring that such pressures will not fluctuate during the portion of the welding cycle in which they are applied, it is possible successfully to pressure weld a wide variety of metals and alloys that require for successful welding close adherence to a set of recommended welding conditions and techniques.

For convenience, the apparatus embodying this invention now being employed have the various electrical apparatus, fluid regulators, solenoid-operated valves, pressure gauges and interassociated parts mounted in a central control cabinet. However, such arrangement is not essential. Other arrangements of apparatus within the scope of the appended claims will suggest themselves to persons skilled in the art for practicing the process features of the invention herein described. Thus, a single timer having three motor-controlled switches controlled by a single motor that is energized through a single relay may be substituted for the two timers TDI and TD2.

By setting the timer TD2 to operate a sufficiently long time after TDI functions, a single pressure may be used throughout a welding operation since the limit switch then functions to complete the series of cycles before valve 78 can open to increase the pressure. Furthermore, because of the use of a four-way valve 78, the initial pressure from regulator 71 is blanked off when valve 78 is energized, hence the initial pressure is entirely independent of the final pressure and can be lower or higher than the latter.

Moreover, the timer TD2 may be replaced by a switch somewhat similar to switch LS and mounted on the movable clamping unit whereby, when unit M begins to move toward unit F a switch similar to switch Sx is closed and solenoid SO4 is energized to actuate valve 78 and apply the final welding pressure. Such an arrangement of apparatus appears in Figures 4 and 5. As shown in Figure 4, a rod 83 is adjustably secured to the movable clamping unit M. For controlling the application of the final welding pressure a normally open switch 128 in line 130 leading from line 96 has a lever arm adapted to contact and cooperate with a trip member 132 adjustable axially of the rod 83 and securable thereon by a set screw. The line 130 has therein the solenoid SO4 of valve 78. For opening all electrical circuits thereby terminating the welding cycle, deenergizing each of the relays R1 to R4 and resetting the timer TDI a normally closed limit switch LS like that shown in Fig. 3 has a lever arm adapted to cooperate with a trip member C' mounted for adjustment along rod 83 carried by the movable clamping unit M. The member C' is securable to the rod by means of a set screw. The limit switch LS functions like the corresponding switch of Figure 3.

The arrangement of switch 128 and associated parts is such that upon initiation of the upsetting of the metal of the members being welded, the switch 128 closes an electric circuit through lines 91, 96 and 130 and actuates valve 78 to conduct fluid under pressure through line 81 to piston 49 for transmitting liquid pressure from chamber 51 to the pistons 30, 30 of the welding apparatus. This pressure is continued until the limit switch is opened by contact with trip member C', as described. An electrical line 111 having therein switch Sb leads to the solenoid SO4 and permits regulation of valve 78 when no current flows in line 130.

The invention is susceptible of modification within the scope of the appended claims.

We claim:

1. Pressure welding apparatus which comprises mechanism for clamping metal members to be united with a surface of each in abutting relation during a welding operation; pressure means for forcing said abutting surfaces together under a preselected pressure; a reservoir for a hydraulic liquid; a receptacle for a high pressure hydraulic liquid; means connected with said receptacle for applying a preselected high pressure upon liquid in said receptacle; a liquid conduit interconnecting said reservoir, receptacle, clamping mechanism and said first-named pressure means; a check valve in said conduit between said reservoir and said receptacle, clamping mechanism and pressure means, said check valve being effective to prevent liquid flow through said conduit past said check valve to said reservoir; a pilot control for rendering said check valve inoperative; a conduit for supplying air under pressure to said reservoir; and means including a valve in said air conduit and a solenoid-operated control for such valve for cutting off the supply of air under pressure to the reservoir and for concurrently actuating said pilot-control to render the check valve inoperative.

2. Pressure welding apparatus which comprises mechanism for clamping metal members to be united with a surface of each in abutting relation, said mechanism including a pair of cooperating clamping members and a second pair of clamping members movable toward and from the first pair of clamping members; means for forcing the clamping members of each pair into gripping contact with a respective metal member and for forcing such members into contact under a preselected pressure, the last-named means including a reservoir for a hydraulic liquid and a liquid conduit having therein a pilot-controlled check valve connecting said reservoir and said clamping members; a high pressure receptacle for hydraulic liquid connected with said conduit between said check valve and said clamping members; means operative when said check valve is operative for applying a high preselected pressure upon liquid in said receptacle; an air conduit for conducting air under pressure to said reservoir; an electric control circuit; and a valve in said air conduit having a solenoid control in said electric circuit and effective to actuate the pilot control of said check valve and selectively to render the check valve inoperative and to establish free communication between said reservoir and said clamping mechanism or to render the check valve operative to prevent escape of hydraulic pressure to said reservoir from said clamping mechanism and to apply air pressure upon the liquid in said reservoir and liquid conduit; heating means for directing upon the metal members at and adjacent the abutting surfaces a plurality of closely-spaced welding flames; and means including valve-controlled conduits for a combustible gas and for oxygen, respectively, and a relay and a motor-controlled electric timer switch in said electric circuit, for opening the valves in said valve-controlled conduits and for feeding a combustible gas and oxygen to said heating means after a selected time interval following actuation of said solenoid-operated valve in said air conduit to render the check valve operative.

3. Apparatus as defined in claim 2 wherein the heating means comprises a torch head, conduits for feeding a combustible gas and oxygen to said head, a valve in said oxygen conduit, a solenoid control for said oxygen valve in said electric circuit, a valve for combustible gas, means controlled by pressure of oxygen at the outlet side of the oxygen valve for operating said gas valve immediately subsequent to said oxygen valve, and means including a relay and a motor-controlled electric switch in said electric circuit for actuating said solenoid control to open the oxygen valve after a selected time interval following actuation of said solenoid-operated valve in said air conduit to render the check valve operative.

4. Butt-welding apparatus comprising a frame; means supported by said frame for clamping two members of weldable metal with a surface of each in abutting relation; pressure-applying means for forcing together said abutting surfaces under a preselected pressure; a hydraulic system comprising hydraulic means for actuating said clamping means and said pressure-applying means, a reservoir for a hydraulic pressure liquid, a conduit for pressure liquid connecting said reservoir with said clamping means and with said pressure-applying means, means connected with said conduit for applying a higher pressure upon the liquid in said conduit, and an air-controlled check valve in said conduit and disposed between the last-named means and said reservoir for preventing flow of liquid under such higher pressure to said reservoir; means for applying a selected air pressure upon a body of liquid in said reservoir; and means including an electric switch and an operator therefor, one associated with said clamping means and the other associated with said frame and responsive to a selected shortening of the members being welded for concurrently rendering said last-named means, said higher pressure-applying means and said check valve inoperative, thereby releasing the clamping pressure on said members and the pressure forcing the abutting surfaces together and bringing all parts of the hydraulic system to substantially the same pressure.

5. Butt-welding apparatus comprising a fixed clamping unit and a movable clamping unit, each of such units having members cooperating for clamping one of two members of weldable metal with a surface of each thereof in abutting relation; a source of low clamping pressure and a source of high welding pressure; means for applying a low clamping pressure to such clamping members; pressure-applying means for forcing together said abutting surfaces under high welding pressure; a common conduit for transmitting pressure from each of said pressure sources to said clamping pressure means and to said welding pressure means; means for applying welding heat to said metal members at and adjacent the abutting ends thereof; means for causing relative movement toward and from each other of the respective members of each clamping unit associated with each metal member; and means including a resilient member operatively interposed between said fixed clamping unit and said movable clamping unit and resisting movement of said movable unit toward said fixed unit, said resilient member being sufficiently strong to prevent actuation of said welding pressure-applying means under the influence of low pressure supplied to said clamping means, whereby actuation of said clamping pressure-applying means under low clamping pressure does not actuate said welding pressure-applying means.

6. Pressure welding apparatus which comprises clamping mechanism for securing metal members to be united with a surface of each in abutting relation during a welding operation; pressure means for forcing said abutting surfaces together under a preselected pressure; heating means for applying welding flames simultaneously to each of said members at and adjacent said abutting surfaces; means including a solenoid-controlled valve for actuating said clamping means; solenoid-controlled electric timing switches actuated by the solenoid control of said valve and additional solenoid-controlled valves operated by said switches for actuating said pressure means and said heating means successively at predetermined time intervals following the actuation of said clamping means; mechanism including an electric timing switch actuated by one of the first-named timing switches for selectively increasing the pressure transmitted by said pressure means to a preselected value after a selected time interval following actuation of said heating means; and means responsive to a preselected shortening of the metal members during the application of heat and pressure for rendering inoperative said clamping means, said pressure means and said heating means.

7. Pressure welding apparatus which comprises a frame; fluid pressure-operated mechanism for clamping metal members to be united with a surface of each in abutting relation during a welding operation; fluid pressure-applying means for forcing said abutting surfaces together under a preselected pressure; heating means for applying welding flames simultaneously to each of said members at and adjacent said abutting ends; an electric control circuit; timer means including solenoid-operated valves, relays and motor-controlled switches in said circuit for actuating (1) said clamping mechanism; (2) said pressure-applying means and (3) said heating means in succession at preselected time intervals; a second timer means including a solenoid-operated valve, a relay and a motor-controlled switch in said circuit and controlled by said first-named timer means for selectively increasing the pressure transmitted to said members by the pressure-applying means after a selected time interval following actuation of said heating means; and means including an electric switch and an operator therefor, one mounted in fixed position relative to said frame and the other connected with said clamping means and responsive to relative movement of said frame and clamping means due to a preselected shortening of the members under the action of welding heat and pressure for simultaneously rendering inoperative said clamping mechanism, said pressure-applying means, and said heating means.

8. Pressure welding apparatus comprising means for clamping two members of weldable metal with a surface of each in abutting relation; pressure means for forcing together said abutting surfaces under a preselected relatively low preheating pressure; an electric circuit; a first control for said pressure means in said circuit; a second pressure means for forcing said abutting surfaces together under a preselected high welding pressure; a second control in said circuit for the last-named pressure means; heating means for directing upon the metal members at and adjacent the abutting surfaces a plurality of closely spaced welding flames; and timer means including a relay and a motor-controlled switch in said circuit for preventing actuation of said high pressure-applying means for a preselected time interval following actuation of said heating means and for actuating said pressure means after such time interval.

9. Butt-welding apparatus comprising a frame; means supported by said frame for clamping two members of weldable metal with a surface of each in abutting relation; pressure-applying means for forcing together said abutting surfaces; a first control for operating said pressure-applying means under a preselected relatively low preheating pressure; additional pressure-applying means for forcing said abutting surfaces together under a preselected high welding pressure; a second control for operating said additional pressure-applying means; heating means for directing upon the members at and adjacent the abutting surfaces a plurality of closely-spaced welding flames; and means including an electric switch and an operator therefor, one mounted on said frame and the other connected with said clamping means and responsive to relative movement of said frame and pressure-applying means due to an initial incipient shortening of the metal members being welded for rendering operative said second control.

10. Butt-welding apparatus comprising a frame; means for clamping two members of weldable metal with a surface of each in abutting relation; pressure means for forcing together said abutting surfaces under a preselected preheating pressure; a first welding pressure control for operating said pressure means; a second welding pressure control for increasing the pressure applied by said pressure means; heating means for directing upon the members at and adjacent the abutting surfaces a plurality of closely-spaced welding flames; means including an electric switch and an operator therefor, one mounted on said frame and the other connected with said clamping means and responsive to relative movement of said frame and said clamping means due to an initial incipient shortening of the metal members being welded for actuating said second welding pressure control; and means including a second electric switch and an operator therefor, one mounted on said frame and the other connected with said clamping means and responsive to a further relative movement of said frame and said clamping means due to a preselected further shortening of the members being welded for releasing the clamping means and said pressure means and for rendering said heating means inoperative.

JOHN P. COWIE.
CHARLES J. BURCH.

REFERENCES CITED

The following references are of record in the file of this patent:

UNITED STATES PATENTS

| Number | Name | Date |
| --- | --- | --- |
| 627,385 | Brockie | June 20, 1899 |
| 2,029,335 | Oberhoffken | Feb. 4, 1936 |
| 2,061,287 | Muehl | Nov. 17, 1936 |
| 2,302,353 | Smith | Nov. 17, 1942 |
| 2,338,305 | Simmon | Jan. 4, 1944 |
| 2,376,765 | Forbes | May 22, 1945 |
| 2,392,824 | Lytle | Jan. 15, 1946 |
| 2,434,352 | Edwards | Jan. 13, 1948 |

OTHER REFERENCES

Steel, Pinton Publishing Co., Cleveland, Ohio, May 21, 1945, page 115.